(12) United States Patent
Laurösch et al.

(10) Patent No.: US 7,012,516 B2
(45) Date of Patent: Mar. 14, 2006

(54) CUPBOARD MONITORING DEVICE

(75) Inventors: Sven Laurösch, Haiger (DE); Ralf Dahmer, Olpe (DE); Jörg Kreiling, Biebertal (DE)

(73) Assignee: Rittal GmbH & Co. KG, Herborn (DE)

( * ) Notice: Subject to any disclaimer, the term of this patent is extended or adjusted under 35 U.S.C. 154(b) by 252 days.

(21) Appl. No.: 10/466,804

(22) PCT Filed: Mar. 14, 2002

(86) PCT No.: PCT/EP02/02833

§ 371 (c)(1),
(2), (4) Date: Jul. 18, 2003

(87) PCT Pub. No.: WO02/075467

PCT Pub. Date: Sep. 26, 2002

(65) Prior Publication Data

US 2004/0070497 A1 Apr. 15, 2004

(30) Foreign Application Priority Data

Mar. 20, 2001 (DE) .......................... 101 13 627

(51) Int. Cl.
*G08B 23/00* (2006.01)

(52) U.S. Cl. ................ 340/501; 340/500; 340/506; 361/695

(58) Field of Classification Search ............... 340/500, 340/501, 506, 531, 605, 679, 691.1, 691.6; 361/676, 679, 694, 695, 831; 709/224; 714/4, 714/23, 43
See application file for complete search history.

(56) References Cited

U.S. PATENT DOCUMENTS

| | | | | |
|---|---|---|---|---|
| 6,041,851 A | * | 3/2000 | Diebel et al. ........... 165/104.33 |
| 6,163,854 A | * | 12/2000 | Hain et al. ...................... 714/4 |
| 6,222,448 B1 | * | 4/2001 | Beck et al. .................. 340/506 |
| 6,346,882 B1 | * | 2/2002 | Hain et al. ................... 340/521 |
| 6,348,745 B1 | * | 2/2002 | Laurosch et al. ............ 307/112 |
| 6,549,127 B1 | * | 4/2003 | Strackbein et al. ......... 340/506 |
| 6,693,528 B1 | * | 2/2004 | Hain et al. ................... 340/506 |
| 6,744,363 B1 | * | 6/2004 | Nicolai et al. .............. 340/506 |
| 2002/0005667 A1 | | 1/2002 | Ciliox et al. | |

FOREIGN PATENT DOCUMENTS

| | | |
|---|---|---|
| DE | 33 26 977 A1 | 2/1985 |
| DE | 41 13 170 A1 | 11/1991 |
| DE | 196 09 651 C2 | 1/1998 |
| DE | 299 21 067 U1 | 2/2000 |
| DE | 200 08 497 U1 | 9/2000 |
| DE | 199 12 030 A1 | 10/2000 |
| WO | WO 97/34345 | 9/1997 |

* cited by examiner

*Primary Examiner*—Jeffery Hofsass
*Assistant Examiner*—George A Bugg
(74) *Attorney, Agent, or Firm*—Pauley Petersen & Erickson

(57) ABSTRACT

A cupboard monitoring device, for fitting in a cupboard, including a rack or a rack-like folded structure and for monitoring and control of functions affecting the cupboard itself, including a temperature monitoring and a temperature regulation, by a monitoring unit, arranged within a housing, having a housing upper piece and housing lower piece, with connected sensors. Advantageous equipping of a cupboard with the cupboard monitoring device can be achieved if the housing is embodied as a roof unit, with fixing holes arranged in the boundary region thereof for connection to the rack or the rack-like folded structure, where at least one part of the sensors are arranged on the underside of the housing lower piece, facing the cupboard interior.

18 Claims, 1 Drawing Sheet

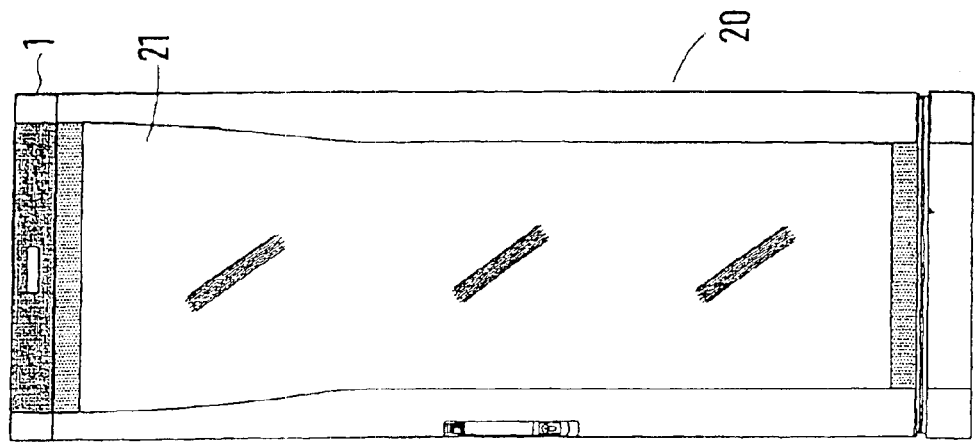
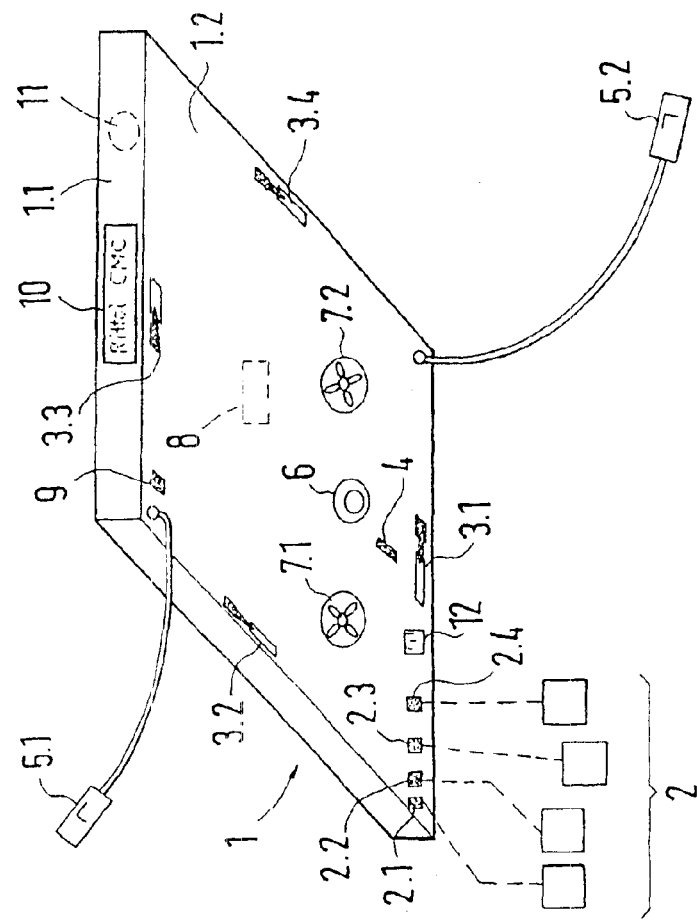

CUPBOARD MONITORING DEVICE

BACKGROUND OF THE INVENTION

1. Field of the Invention

This invention relates to a cabinet monitoring device for installation in a cabinet having a rack or frame-like edges for monitoring and controlling functions regarding the cabinet, network cabinet or server cabinet itself, including temperature monitoring and temperature regulation, and having a monitoring unit and sensors connected thereto, arranged in a housing with an upper housing element and a lower housing element.

2. Discussion of Related Art

A cabinet monitoring device is taught by PCT International Publication WO 97/34345. In this known cabinet monitoring device, various sensors, for example temperature sensors, vibration sensors, smoke detectors, humidity sensors, voltage sensors, door limit stop switches, and the like, as well as actuators and data transmission connections with external operating devices, are connected or can be connected via input and output interfaces to a central control device with a processor or microcontroller. Various components, such as a cooling device, exhaust fan or heater with appropriate control and regulating components can be provided for temperature regulation. The monitoring device has a flat housing of a height of, for example, two height units, which can be installed in the cabinet, and on its back and/or front side it has connector sockets for the sensors, actuators and the data transmission connections to the external operating device. A retrofitting of such a cabinet monitoring device in a switchgear cabinet can be connected but with a considerable cost.

SUMMARY OF THE INVENTION

One object of this invention is to provide a cabinet monitoring device of the type mentioned above but which also allows a later integration into a cabinet.

This object is attained with a housing that is embodied as a roof unit with fastening receivers provided in its edge areas for connection with the rack or the frame-like edges, wherein at least a part of the sensors is arranged on the underside of the lower housing element facing the cabinet interior.

With these steps it is possible to easily retrofit the cabinet, for example a switchgear cabinet, network cabinet or server cabinet, with a cabinet monitoring device, wherein the cabinet interior, which may have installations provided by the user, remains completely usable and wiring is minimized, because sensors necessary for the functioning of the cabinet are already arranged in a suitable way on the roof unit.

In one embodiment, at least one exhaust fan is installed in at least one opening on the lower housing element, and in its or their vicinity a smoke detector. Smoke possibly being generated in the cabinet interior is conducted into the range of the smoke detector by the exhaust fans, which are provided for cooling and are advantageously arranged, so that the sensor dependably reacts.

In another embodiment an access sensor is arranged in at least one front edge area of the underside of the roof unit which, in the installed state, is in operative contact with a facing upper edge section of a front door, a rear door or the rear wall or side wall, which have or form a complementary element. A definite solid connection, without the need for connecting or placing additional cables outside of the housing, also results for the access sensors, which can also be arranged on the sides or rear edge areas, in addition to the edge area at the front. If embodied as a magnetic sensor, for example on the basis of a reed relay, an accurate positional relationship with the counter-element, or an appropriately embodied edge section, of the adjacent door or wall is assured.

If connector sockets for a locking control unit for the front door and/or the rear door and/or for additional units and/or for an electrical power supply are installed in an area in a rear and/or side edge area and/or a front/side corner area of the underside of the roof unit, which is accessible in the installed state, then it is easy to connect at least one locking control unit with a card reader, for example, or other identification unit and possibly an actuator unit, as well as additional sensors, such as temperature sensors in a heat pocket which must be particularly monitored, or additional humidity sensors, or the like.

An unimpeded guidance and connection of the cables for the connected additional elements, or locking control units, is possible due to the measures, wherein the connector sockets for the additional units and the electrical power supply are arranged in the rear edge area, those for the locking control unit of the rear door in a rear/side corner area on a locking side, and/or those for the locking control unit of the front door in a front/side corner area on a locking side.

The construction as a prefabricated unit is enhanced because the sensors arranged on the underside of the roof unit are connected in the interior of the roof unit to a circuit panel of the monitoring unit mounted on the top of the lower housing element.

The structure of the housing can be provided so that the lower housing element is embodied as a flat mounting plate and the upper housing element has edges, which are oriented downward at right angles, on the front, the rear and in the side areas, whose lower edges are tightly connected with the lower housing element.

An advantageous control possibility for an operator is to have a display unit installed in the front edge.

In one embodiment, for automatic checking of an additional authorization, a transponder is arranged at the front edge.

Access takes place, for example, by a master key, or by SNMP (network) or via other reading systems.

In one embodiment of a cabinet it has a cabinet monitoring device of the above described type. With a cabinet that has a conventional roof it is only necessary to take it off and replace it with the roof unit of the cabinet monitoring device, wherein the fastening points remain the same.

BRIEF DESCRIPTION OF THE DRAWINGS

This invention is explained in greater detail in view of an exemplary embodiment and the drawings, wherein:

FIG. 1 is a perspective schematic view of a cabinet monitoring device; and

FIG. 2 is a front view of a cabinet having a cabinet monitoring device.

DESCRIPTION OF PREFERRED EMBODIMENTS

A cabinet monitoring device is shown in FIG. 1 and has, as its central element, a roof unit 1 with an upper housing element 1.1 and with a lower housing element 1.2, which covers it on the underside, in which a monitoring unit with an electronic circuit located on a circuit panel is arranged.

Various sensors, connected on the top of the lower housing unit 1.2 with the electronic circuit forming a control unit for monitoring and controlling cabinet functions in accordance with appropriately predetermined or predeterminable, in particular programmable parameters, are mounted on the underside of the lower housing unit 1.2, which is embodied as a flat mounting panel, and are oriented in the installed state toward the interior of the cabinet 20, as shown in FIG. 2. PCT International Publication WO 97/34345 discloses details of the cabinet functions which can be monitored and controlled. Corresponding functions can also be partially or entirely provided by the cabinet monitoring device of this invention.

An access sensor 3.1 for a rear door or rear wall, access sensors 3.2, 3.4 for the two side walls, as well as an access sensor 3.3 for a front door are arranged on the housing underside at the front, side and rear edge areas, which are designed as magnetic sensors, for example on the basis of a reed relay, and work together with complementary elements or sections arranged in the upper area at corresponding locations of the rear door, side walls and front door 21 for detecting the removal of a side wall or opening of a door. Connector sockets 2.1 for an additional temperature sensor, 2.2 for an additional humidity sensor, 2.3 for a further sensor or a data transmission connection to an auxiliary device or a electrical power supply, and 2.4 for an additional electrical power supply or an electrical power supply monitoring device such as for additional units 2, are installed in the rear edge area of the underside of the roof unit 1.

Also, an exhaust fan 7.1 and a spaced apart further exhaust fan 7.2, and a smoke detector 6 between them, are installed on the underside of the lower housing element 1.2. Smoke, which might be generated in the cabinet 20, is brought into the range of the smoke detector 6 by the exhaust fans 7.1, 7.2, so that the creation of smoke can be dependably detected by the smoke detector 6. With a temperature sensor 4, also mounted on the underside of the lower housing element 1.2, the interior cabinet temperature, in particular the general temperature, can be reliably detected and, if a threshold temperature is exceeded, the temperature can be reduced by triggering the controlled exhaust fans 7.1, 7.2 and/or another or additional cooling unit.

Further connector sockets for connecting locking control units 5.1, 5.2 for the front door 21, or a rear door, are arranged in a side/rear and a side/front corner area, wherein the corner areas are located above the closing sides of the doors, so that an unimpeded, as short as possible cable connection from the closing control units 5.1, 5.2 to the associated connector sockets is achieved. The locking control units 5.1, 5.2 for example can have a card reader or other identification unit, and can also have an actuating unit, which can be addressed by the control unit. Furthermore, a connector socket 9 for a read-out connector, for example for reading out data stored in the control unit, is arranged in a front lateral corner area, and is also easily accessible from the front in case of installations in the front door.

Moreover, a connector 12 for an electrical power supply with a wide range of supply voltages of, for example 100 to 230 V, is arranged on the underside of the lower housing element 1.2, while a power supply 8 for providing the electronic circuit, and if required the sensors, with voltage is arranged in the roof unit 1 on the top of the lower housing element 1.2.

On the front, rear and in both lateral areas, the upper housing element has an edge, which is oriented downward at right angles. A display unit 10, for example with a fluorescent display, is installed in the front edge, by which essential information can be displayed to an operator on the outside of the cabinet without it necessary to open the cabinet. A transponder 11 is arranged in the front edge, by which an access authorization of a user can be automatically checked.

On its underside, the roof unit 1 has fastening points for its attachment to the top of a frame, or frame-like edge of the cabinet 20, which advantageously correspond to the fastening points of a simple covering roof, so that it can be attached in place of a simple covering roof, or can be exchanged for it. In this case the lower housing element 12 can be attached in a sealed manner to the frame, or the frame-like edge, while the upper housing element 1.1 itself can be attached in a sealed manner to the lower housing element 1.2.

Still further suitable sensors, such as further temperature sensors, humidity sensors or vibration sensors can be arranged in the roof unit 1, in particular on the lower housing element 1.2. It is advantageous to provide suitable cable guides and cable support possibilities for the cables used for connecting the additional units 2, or of an electrical power supply connector. All plugs for additional units 2, or further additional elements to be connected to the roof unit 1 are easily accessible from the cabinet interior.

A cabinet monitoring device is made available by the described steps, with which a reduction of cables and simple connecting options, a simple assembly and simple retrofitting can be achieved, while the cabinet interior is fully usable.

What is claimed is:

1. A cabinet monitoring device for installation in a cabinet (20) having a rack or frame edges for monitoring and controlling functions regarding the cabinet (20), including temperature monitoring and temperature regulation, and having a monitoring unit and sensors (3.1, 3.2, 3.3, 3.4, 4, 5.1, 5.2, 6) connected thereto, arranged in a housing with an upper housing element (1.1) and a lower housing element (1.2), the cabinet monitoring device comprising:

the housing embodied as a roof unit (1) with fastening receivers in edge areas for connection with the rack or the frame edges, and at least a part of the sensors (3.1, 3.2, 3.3, 3.4, 4, 4.1, 5.1, 5.2, 6) arranged on an underside of the lower housing element (1.2) facing a cabinet interior.

2. The cabinet monitoring device in accordance with claim 1, wherein at least one exhaust fan (7.1, 7.2) is installed in at least one opening on the lower housing element (1.2) near a smoke detector (6).

3. The cabinet monitoring device in accordance with claim 2, wherein an access sensor (3.3) is arranged in at least one front edge area of the underside of the roof unit (1) which in an installed state is in operative contact with a facing upper edge section of one of a front door (2.1), a rear door and a rear wall and side wall, each of which forms a complementary element.

4. The cabinet monitoring device in accordance with claim 3, wherein connector sockets (21 to 2.4, 9, 12) for a locking control unit (5.1, 5.2) for at least one of the front door (21) and the rear door and for at least one of additional units (2) and an electrical power supply are installed in an area in one of a rear and a side edge area and a front/side corner area and a rear/side corner area of the underside of the roof unit (1), which is accessible in the installed state.

5. The cabinet monitoring device in accordance with claim 4, wherein the connector sockets (2.1 to 2.4, 12) for the additional units (2) and the electrical power supply are managed in the rear edge area, for the locking control unit (5.2) of the rear door are arranged in a rear/side corner area on a locking side, and for the locking control unit (5.1) of the front door in a front/side corner area on a locking side.

6. The cabinet monitoring device in accordance with claim 5, wherein the sensors (3.1 to 3.4, 4, 6) arranged on the underside of the roof unit (1) are connected in an interior of the roof unit (1) to a circuit panel of the monitoring unit mounted on a top of the lower housing element (1.2).

7. The cabinet monitoring device in accordance with claim 6, wherein the lower housing element (1.2) is embodied as a flat mounting plate and the upper housing element (1.1) has edges which are oriented downward at right angles, on the front, the rear and in the side areas, and with lower edges that are tightly connected with the lower housing element (1.2).

8. The cabinet monitoring device in accordance with claim 7, wherein a display unit (10) is installed in the front edge.

9. The cabinet monitoring device in accordance with claim 8, wherein transponder (11) is arranged at the front edge.

10. The cabinet monitoring device according to claim 9, having a cabinet.

11. The cabinet monitoring device in accordance with claim 1, wherein an access sensor (3.3) is arranged in at least one front edge area of the underside of the roof unit (1) which in an installed state is in operative contact with a facing upper edge section of one of a frontal door (2.1), a rear door and a rear wall and side wall, each of which forms a complementary element.

12. The cabinet monitoring device in accordance with claim 1, wherein connector sockets (21 to 2.4, 9, 12) for a locking control unit (5.1, 5.2) for at least one of the front door (21) and the rear door and for at least one of additional units (2) and an electrical power supply are installed in an area in one of a rear and a side edge area and a front/side corner area and a rear/side corner area of the underside of the roof unit (1), which is accessible in the installed state.

13. The cabinet monitoring device in accordance with claim 12, wherein the connector sockets (2.1 to 2.4) for the additional units (2) and the electrical power supply are arranged in the rear edge area, for the locking control unit (5.2) of the rear door are arranged in a rear/side corner area on a locking side, and for the locking unit (5.1) of the front door in a front/side corner area on a locking side.

14. The cabinet monitoring device in accordance with claim 1, wherein the sensors (3.1 to 3.4, 4, 6) arranged on the underside of the roof unit (1) are connected in an interior of the roof unit (1) to a circuit panel of the monitoring unit mounted on a top of the lower housing element (1.2).

15. The cabinet monitoring device in accordance with claim 1, wherein the lower housing element (1.2) is embodied as a flat mounting plate and the upper housing element (1.1) has edges which are oriented downward at right angles, on the front, the rear and in the side areas, and with lower edges that are tightly connected with the lower housing element (1.2).

16. The cabinet monitoring device in accordance with claim 15, wherein a display unit (10) is installed in the front edge.

17. The cabinet monitoring device in accordance with claim 15, wherein a transponder (11) is arranged at the front edge.

18. The cabinet monitoring device according to claim 1, having a cabinet.

\* \* \* \* \*